United States Patent [19]

Goodine

[11] 4,304,446

[45] Dec. 8, 1981

[54] PERMANENT SEALED ROLLER BEARING FOR USE IN AGRICULTURAL AND OTHER MACHINES

[76] Inventor: Herbert M. Goodine, R.R. No. 2, Arthurette, Victoria County, North Tilley, New Brunswick, Canada, E0J1C0

[21] Appl. No.: 149,421

[22] Filed: May 13, 1980

[30] Foreign Application Priority Data

Mar. 18, 1980 [CA] Canada .................................. 347869

[51] Int. Cl.³ ............................................ F16C 33/78
[52] U.S. Cl. .................................. 308/187.1; 308/214
[58] Field of Search ................. 308/187.1, 187.2, 214, 308/36.1, 36.2, 207 R, 236

[56] References Cited

U.S. PATENT DOCUMENTS

| 2,915,657 | 12/1959 | Van Rijn | 308/76 |
| 3,423,138 | 1/1969 | Hardy | 308/132 |
| 3,960,415 | 6/1976 | Westervelt | 308/36.1 |
| 4,097,095 | 6/1978 | Zimmer | 308/214 |
| 4,210,339 | 7/1980 | Povejsil | 308/187.1 |

Primary Examiner—Lenard A. Footland
Attorney, Agent, or Firm—Lewis H. Eslinger

[57] ABSTRACT

A bearing assembly for use in dusty and gritty environments having an enclosed roller or ball bearing on a short stub shaft and having a retainer ring for the outer race of the bearing, one side of the race being totally enclosed at the end remote from the stub shaft and two spaced apart sealing members disposed on the same side of the bearing as is the retaining ring, the sealing members being in sliding engagement with an interior bore in a rotating structure supported by the bearing and the exterior surface of the stub shaft.

7 Claims, 2 Drawing Figures

PERMANENT SEALED ROLLER BEARING FOR USE IN AGRICULTURAL AND OTHER MACHINES

This invention relates to sealed bearings and particularly, but not exclusively, to roller bearings suitable for agricultural use or in dusty or gritty environments.

Prior art bearings of the class are typified by the following patents:

Canadian Pat. No. 670,672, issued Sept. 17, 1963 to Jay Manufacturing Company shows a conveyor belt support bearing whose main feature is the inclusion of shock absorbing means for axial forces applied thereto. Such a bearing is of undue complexity and of relative high cost.

U.S. Pat. No. 4,097,095, issued June 27, 1978 to Aaron Zimmer, shows a rather complex bearing in the form of self-lubricated cartridge suitable for easy replacement in a conveyor belt system.

It is a feature of one object of the invention to provide a sealed bearing of simple construction, easy of assembly and of low cost.

It is a feature of another object of the invention to provide a sealed bearing for extended use in environments containing the highest levels of grit and dust.

It is a feature of another object of the invention to provide a sealed bearing having a relatively high level of protection against ingress of grit and dust.

It is a feature of another object of the invention to provide a seal bearing which is easy to fit or remove in the field.

In accordance with the foregoing objects, there is provided:

a sealed bearing assembly, comprising:
(1) a spindle having a longitudinal hole in the centre of said spindle and extending throughout the length thereof, said spindle being adapted, in use, for bolting to associated fixed supporting structure,
(2) a body member rotatable with respect to said spindle and having a circular bore,
(3) an antifriction bearing assembly disposed between said body member and said spindle,
(4) a snap ring, disposed within the said body member said snap ring abutting said outer race,
(5) a first sealing member and one-side of and adjacent to said antifriction bearing assembly and being in sealing engagement with the interior of said body member said first sealing member being formed of an absorbent felt-like material, and
(6) a second sealing member on the same side of the said antifriction bearing assembly said second sealing ring being of a low friction semi-rigid material and disposed within said and in sealing engagement with said body member.

There is also provided:
a sealed bearing assembly, comprising:
(1) a spindle having:
  (a) a circular journal region of a selected diameter at one end thereof,
  (b) a circular packing step region of larger diameter than that of said journal region and disposed adjacent thereto,
  (c) a closure region of larger diameter than that of said step region and disposed adjacent thereto, said closure region having an annular groove of selected depth therein,
  (d) a boss region of smaller diameter than that of said closure region and extending from the said closure region to the other end of said spindle,
  (e) a longitudinal hole in the centre of said spindle and extending throughout the length thereof, said spindle being adapted, in use, for bolting to associated fixed supporting structure,
(2) a body member having:
  (a) a first circular bore of a diameter slightly larger than that of said closure region thereby permitting sliding cooperation between said body member and said closure region, said first bore extending from the outer surface of said body into the interior of said body member to form a step at the interior end of the said bore;
  (b) an annular groove in said first bore,
  (c) a second bore extending from said step to the outer surface of said body,
  (d) a recess in said second bore disposed adjacent the outer end thereof,
(3) an antifriction bearing assembly, comprising:
  (a) an inner race having a bore of diameter selected to provide, upon assembly, an interference fit when mounted on said journal region,
  (b) an outer race having a maximum diameter selected to provide, upon assembly, an interference fit when mounted within said first circular bore of said body member,
  (c) a plurality of antifriction elements disposed between said inner and outer races,
(4) a snap ring, disposed in the said annular groove in said first bore, said snap ring abutting said outer race,
(5) a first annular sealing member having a cross-section which is substantially rectangular, said sealing member being disposed, on assembly, on said packing step region and in sealing engagement with said first bore of said body member, one side of said first sealing member abutting said spindle and the other side of said sealing member abutting said snap ring, said first sealing member being formed of an absorbent felt-like material,
(6) a second annular sealing member having a cross-section which is substantially rectangular, said second sealing ring being of a low friction semi-rigid material and disposed, upon assembly, into said annular groove in said spindle, and in sealing engagement with said first bore of said body member,
(7) a bolt extending throughout said longitudinal hole in said spindle, a first washer disposed between said inner race and a head on one end of said bolt, a second washer disposed between said spindle and a nut on the other end of said bolt, and
(8) a closure cap disposed in the said recess of the said body member.

A preferred embodiment of the invention will now be described with reference to the accompanying drawings, in which.

For purposes of illustration, the invention will be described as applied to a roller forming part of a conveyor system or the like and which per se forms no part of the present invention. The body of the roller may be of any size or shape to suit the purpose for which it is to be used. It is to be understood, however, that the essential elements of the bearing may be used to support other mechanical members, such as idler wheels, outboard or cantilevered rotating assemblies, clutch devices and the like.

Figure 2:
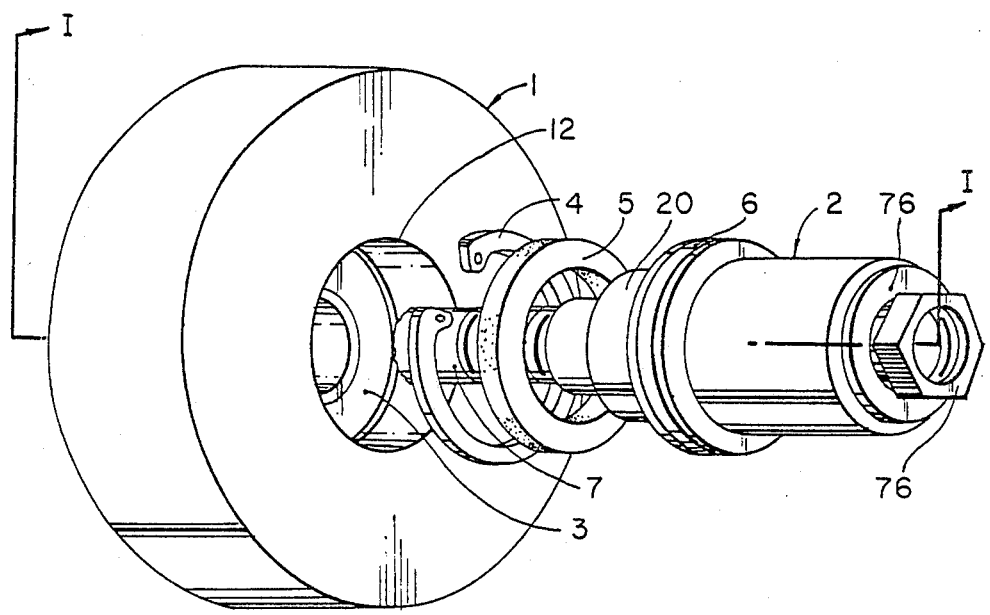
FIG. 2 is an exploded view of the bearing shown in FIG. 1.
Figure 1:
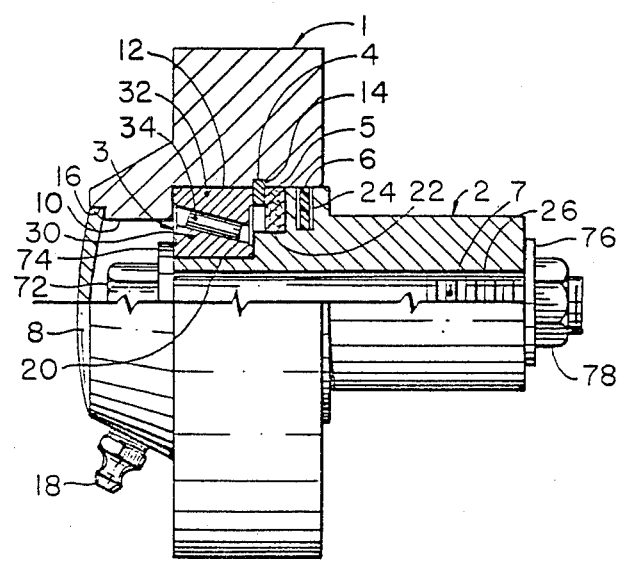
FIG. 1 is a side view of a bearing assembly shown partly in section along the line I—I in FIG. 2.

Referring now to FIGS. 1 and 2, a roller support body is generally indicated at 1, and the external configuration may be of any size and shape to suit the purpose for which the assembly is to be used. The body 1 includes a smaller bore 10, a larger bore 12, a groove 14 and a recess 16 disposed adjacent the exterior end of the bore 10. A grease nipple 18, communicating with the bore 10, may be included.

A spindle unit, generally indicated at 1, comprises a journal 20, a packing step 22, a groove 24 and a longitudinal hole 26.

The spindle 2 is provided with an annular grease seal 5 which is in a relatively loose sliding fit with packing step 22 on the inner diameter thereof and a somewhat tighter fit, on assembly, with the bore 12 on the outer diameter of the seal 5. The seal may be formed of felt material and the like. A second annular seal 6, which is provided with a diametral severance (not shown), is sprung, during assembly, into the groove 24 and after assembly the seal 6 abuts the bore 12 of the body 1. The seal 6 may be formed of a soft metal, nylon or TEFLON (A Trademarked Polytetrafluorethylene).

A roller bearing, generally indicated at 3, comprises an inner race 30, an outer race 32 and a set of rollers 34. It is to be understood that bearing 3 may be of the ball type. The bearing 3 is received in the larger bore 12 and retained therein by a snap ring 4.

The assembly, as a whole, may be mounted on associated supporting structure (not shown) by means of a bolt, generally indicated at 7, which passes through the longitudinal hole 26. The bolt is provided with a head 72, a washer 74, a washer 76 and a nut 78. A web-like member (not shown) forming part of the associated structure will have a hole therein through which the bolt 7 is passed prior to fitment of the washer 76 and nut 78. It is to be noted that the washer 74 locks the inner race 34 onto and prevents rotation about the journal 20. A watertight frost plug 8 may be fitted in the recess 16 after assembly.

The assembly may be used on patents harvesting machines, other agricultural machines operated in a dusty or gritty environment or in numerous other applications where accessibility is difficult and regular maintenance is hard to achieve.

The device described hereinbefore overcomes the universal shortcomings of the prior art, by providing a unitary bearing assembly which has a fully protected grease seal, is fully protected against the elements, which is relatively inexpensive and easy to install.

What I claim as my invention is:

1. A sealed bearing assembly, comprising
   (1) a spindle having a longitudinal hole in the centre of said spindle and extending throughout the length thereof, said spindle being adapted, in use, for bolting to associated fixed supporting structure,
   (2) a body member rotatable with respect to said spindle and having a circular bore,
   (3) an antifriction bearing assembly disposed between said body member and said spindle and having an outer race,
   (4) a snap ring, disposed within the said body member said snap ring abutting said outer race,
   (5) a first sealing member at one-side of and adjacent to said antifriction bearing assembly and being in sealing engagement with the interior of said body member, said first sealing member being formed of an absorbent felt-like material, and,
   (6) a second sealing member on the same side of the said antifriction bearing assembly as said first sealing member, said second sealing ring being of a low friction semi-rigid material and disposed within and in sealing engagement with said body member.

2. A sealed bearing assembly as in claim 1, further including a longitudinal hole in said spindle; and a closure cap disposed in a recess of the said body member.

3. A sealed bearing assembly as in claim 2, further including means for fastening said spindle to associated supporting structure.

4. A sealed bearing assembly as in claim 3, wherein said fastening means comprises a bolt disposed in said longitudinal hole.

5. A sealed bearing assembly as in claim 1, wherein said bore is closed at one end thereof by a plug member.

6. A sealed bearing assembly, comprising:
   (1) a spindle having:
      (a) a circular journal region,
      (b) a circular packing step region disposed adjacent to said journal region,
      (c) a closure region disposed adjacent to said journal region, said closure region having a groove therein,
      (d) a boss region extending from the said closure region to the other end of said spindle,
      (e) a longitudinal hole in said spindle and extending throughout the length thereof, said spindle being adapted, in use, for fastening to associated fixed supporting structure,
   (2) a body member having:
      (a) a first circular bore permitting sliding cooperation between said body member and said closure region,
      (b) a groove in said first bore,
      (c) a second bore, of smaller size than said first bore, and extending to the outer surface of said body,
   (3) an antifriction bearing assembly disposed between said body member and said spindle,
   (4) a snap ring, disposed in the said groove in said first bore, said snap ring abutting said bearing assembly,
   (5) a first annular sealing member having a cross-section which is substantially rectangular, said sealing member being disposed, on assembly, in sealing engagement with said first bore of said body member, one side of said first sealing member abutting said spindle and the other side of said sealing member abutting said snap ring, said first sealing member being formed of an absorbent felt-like material,
   (6) a second sealing member, said second sealing ring being of a low friction semi-rigid material and disposed, upon assembly, into an annular groove in said spindle, and in sealing engagement with said first bore of said body member, and,
   (7) a bolt extending throughout said longitudinal hole in said spindle, a nut on the other end of said bolt, said bolt serving, in use, to fasten said sealed bearing assembly to associated supporting structure.

7. A sealed bearing assembly, comprising:
   (1) a spindle having:
      (a) a circular journal region of a selected diameter at one end thereof, (b) a circular packing step region of larger diameter than that of said journal region and disposed adjacent thereto, (c) a closure region of larger diameter than that of said step region and disposed adjacent thereto, said closure region having an annular groove of selected depth therein, (d) a boss region of smaller diameter than that of said closure region and extending from the said closure region to other end of said spindle, (e) a longitudinal hole in the centre of said spindle and extending throughout the length thereof, said spindle being adapted, in use, for bolting to associated fixed supporting structure, (2) a body member having:

(a) a first circular bore of a diameter slightly larger than that of said closure region thereby permitting sliding cooperation between said body member and said closure region, said first bore extending from the outer surface of said body into the interior of said body member to form a step at the interior end of said bore, (b) an annular groove in said first bore, (c) a second bore extending from said step to the outer surface of said body, (d) a recess in said second bore disposed adjacent the outer end thereof, (3) an antifriction bearing assembly, comprising:

(a) an inner race having a bore of diameter selected to provide, upon assembly, an interference fit when mounted on said journal region, (b) an outer race having a maximum diameter selected to provide, upon assembly, an interference fit when mounted within said first circular bore of said body member, (c) a plurality of antifriction elements disposed between said inner and outer races, (4) a snap ring, disposed in the said annular groove in said first bore, said snap ring abutting said outer race, (5) a first annular sealing member having a cross-section which is substantially rectangular, said sealing member being disposed, on assembly, on said packing step region and in sealing engagement with said first bore of said body member, one side of said first sealing member abutting said spindle and the other side of said sealing member abutting said snap ring, said first sealing member being formed of an absorbent felt-like material, (6) a second annular sealing member having a cross-section which is substantially rectangular, said second sealing ring being of a low friction semi-rigid material and disposed, upon assembly, into said annular groove in said spindle, and in sealing engagement with said first bore of said body member, (7) a bolt extending throughout said longitudinal hole in said spindle, a first washer disposed between said inner race and a head on one end of said bolt, a second washer disposed between said spindle and a nut on the other end of said bolt, and (8) a closure cap disposed in the said recess of the said body member.

* * * * *